(12) United States Patent
Qu et al.

(10) Patent No.: US 11,528,779 B2
(45) Date of Patent: Dec. 13, 2022

(54) REDUCING SIGNALING FOR DATA OVER NON-ACCESS STRATUM VIA AN SGI INTERFACE

(71) Applicant: Telefonaktiebolaget LM Ericsson (publ), Stockholm (SE)

(72) Inventors: Zhiwei Qu, Shanghai (CN); Ping Zhou, Shanghai (CN); Yixin Chen, Shanghai (CN); Sui Xu, Shanghai (CN); Xiaoming Li, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/761,280

(22) PCT Filed: Nov. 13, 2017

(86) PCT No.: PCT/CN2017/110691
§ 371 (c)(1),
(2) Date: May 4, 2020

(87) PCT Pub. No.: WO2019/090760
PCT Pub. Date: May 16, 2019

(65) Prior Publication Data
US 2020/0288539 A1    Sep. 10, 2020

(51) Int. Cl.
*H04W 88/16* (2009.01)
*H04W 8/14* (2009.01)
(Continued)

(52) U.S. Cl.
CPC ............. *H04W 88/16* (2013.01); *H04W 8/14* (2013.01); *H04W 68/02* (2013.01); *H04W 76/19* (2018.02); *H04W 76/34* (2018.02)

(58) Field of Classification Search
CPC ..... H04W 88/16; H04W 76/19; H04W 76/34; H04W 8/14; H04W 8/04; H04W 68/02;
(Continued)

(56) References Cited

U.S. PATENT DOCUMENTS 8,788,826 B1 * 7/2014 Zhao ................... H04L 61/6068
713/171
9,198,022 B1 * 11/2015 Draznin .............. H04L 61/1588
(Continued)

FOREIGN PATENT DOCUMENTS

| CN | 103763762 A | 4/2014 |
|---|---|---|
| CN | 107277842 A | 10/2017 |
| EP | 2903381 A1 | 8/2015 |

OTHER PUBLICATIONS

Huawei, "Release S11-U bearers with Release Access Bearers Request message", 3GPP TSG CT4 Meeting #72bis, C4-162077, Ljubljana, Slovenia, Apr. 11-15, 2016, 1-6.
(Continued)

*Primary Examiner* — Jenee Holland
(74) *Attorney, Agent, or Firm* — Christopher & Weisberg, P.A.

(57) ABSTRACT

The embodiments herein relate to reducing signaling for DoNAS (Data over Non-Access Stratum) via SGi. In one embodiment, there proposes a method (400) in a mobility management node (203), comprising: establishing (S401) an S11-U connection between the mobility management node (203) and a gateway node (204); monitoring (S402) the frequency of data transferring request for a wireless device (201); and deciding (S404) whether or not to release the S11-U connection based on the frequency of data transferring request. With the embodiments herein, the signaling between the mobility management node and the gateway
(Continued)

node can be significantly reduced, without introducing extra signaling or message to the existing network.

14 Claims, 3 Drawing Sheets

(51) Int. Cl.
*H04W 68/02* (2009.01)
*H04W 76/19* (2018.01)
*H04W 76/34* (2018.01)
*H04W 76/12* (2018.01)
*H04W 92/24* (2009.01)
*H04W 76/32* (2018.01)

(58) Field of Classification Search
CPC ..... H04W 92/02; H04W 92/16; H04W 52/48; H04W 36/0033; H04L 12/66
See application file for complete search history.

(56) References Cited

U.S. PATENT DOCUMENTS

| | | | | |
|---|---|---|---|---|
| 9,713,142 B2* | 7/2017 | Lee | .................. | H04W 72/0426 |
| 2006/0120312 A1 | 6/2006 | Yamauchi et al. | | |
| 2011/0016213 A1* | 1/2011 | Nakao | .................... | H04L 43/00 |
| | | | | 709/224 |
| 2014/0235262 A1* | 8/2014 | Cho | .................. | H04W 28/0284 |
| | | | | 455/453 |
| 2015/0016256 A1* | 1/2015 | Skog | ....................... | H04W 4/18 |
| | | | | 370/235 |
| 2015/0223283 A1* | 8/2015 | Wu | ........................ | H04W 76/25 |
| | | | | 370/329 |
| 2015/0223284 A1* | 8/2015 | Jain | ..................... | H04W 72/042 |
| | | | | 370/329 |
| 2016/0021569 A1* | 1/2016 | Chimbili | ............... | H04W 28/08 |
| | | | | 370/235 |
| 2016/0135016 A1* | 5/2016 | Zou | ....................... | H04M 15/66 |
| | | | | 370/312 |
| 2017/0318606 A1* | 11/2017 | Lee | ..................... | H04W 74/004 |
| 2019/0021130 A1* | 1/2019 | Kim | ..................... | H04W 76/20 |
| 2019/0116531 A1* | 4/2019 | Ryu | ........................ | H04W 4/70 |

OTHER PUBLICATIONS

Unknown, Author, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13)", 3GPP TS 29.274 V13.11.0, Sep. 2017, pp. 1-358.
Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 14) The present", 3GPP TS 23.401 V14.5.0, Sep. 2017, pp. 1-393.

* cited by examiner

REDUCING SIGNALING FOR DATA OVER NON-ACCESS STRATUM VIA AN SGI INTERFACE

TECHNICAL FIELD

The embodiments herein relate generally to wireless communication, and more particularly, the embodiments herein relate to method and apparatus of reducing signaling for DoNAS (Data over Non-Access Stratum) via SGi.

BACKGROUND

Currently, according to current third Generation Partnership Project (3GPP) Technical Specification TS23.401 and TS29.274, Mobility Management Entity (MME) could setup the S11-U connection for the wireless device with control plane optimization (i.e., DoNAS). MME should release the S11-U bearers once the wireless device is in idle status, and MME should update the S11-U bearer information once the wireless device is reconnecting to transfer the data by using Modify Bearer Request procedure. One example of the existing procedure is shown in FIG. 1, which is a signaling diagram about setting up and releasing S11-U connection, according to the prior art.

SUMMARY

The problem in the prior art is that this procedure could result in many signaling to release the bearer and re-setup the bearer for S11-U connection. As shown in FIG. 1, the signaling between MME and Serving GateWay (SGW) would be repeated, once there is any request from this wireless device, such as User Equipment (UE).

This problem deteriorates due to the new applications, for example, the shared bicycle recently. For these applications, the wireless device (for example the bicycle) may need to send/receive data to/from the network frequently. As a result, the MME may need to set up and release the S11-U bearers frequently. Therefore, there may be a great waste in the network resources.

In view of the above deficiency, embodiments in this disclosure are to make the MME and SGW keep the S11-U bearers if the device would release/re-setup for S11-U frequently. Thus the embodiments can significantly reduce the signaling between MME and SGW.

In one embodiment, there proposes a method in a mobility management node, comprising: establishing an S11-U connection between the mobility management node and a gateway node; monitoring the frequency of data transferring request for a wireless device; and deciding whether or not to release the S11-U connection based on the frequency of data transferring request.

In another embodiment, there proposes an apparatus configured to operate as a mobility management node, comprising: at least one processor; and a non-transitory computer readable medium coupled to the at least one processor, the non-transitory computer readable medium containing instructions executable by the at least one processor, whereby the at least one processor is configured to: establish an S11-U connection between the mobility management node and a gateway node; monitor the frequency of data transferring request for a wireless device; and decide whether or not to release the S11-U connection based on the frequency of data transferring request.

In still another embodiment, there proposes a computer readable medium comprising computer readable code, which when run on an apparatus, causes the apparatus to perform the above method.

The embodiments herein could decrease the signaling load for the core network. This won't introduce extra signaling or message to the existing network but effectively make full use of the legacy message, which improve the network quality.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which.

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Embodiments herein propose solutions, which make the MME and SGW keep the S11-U bearers if the UE would release/re-setup for S11-U frequently. Thus the embodiments can significantly reduce the signaling between MME and SGW without introducing extra signaling or message to the existing network.

Figure 1:
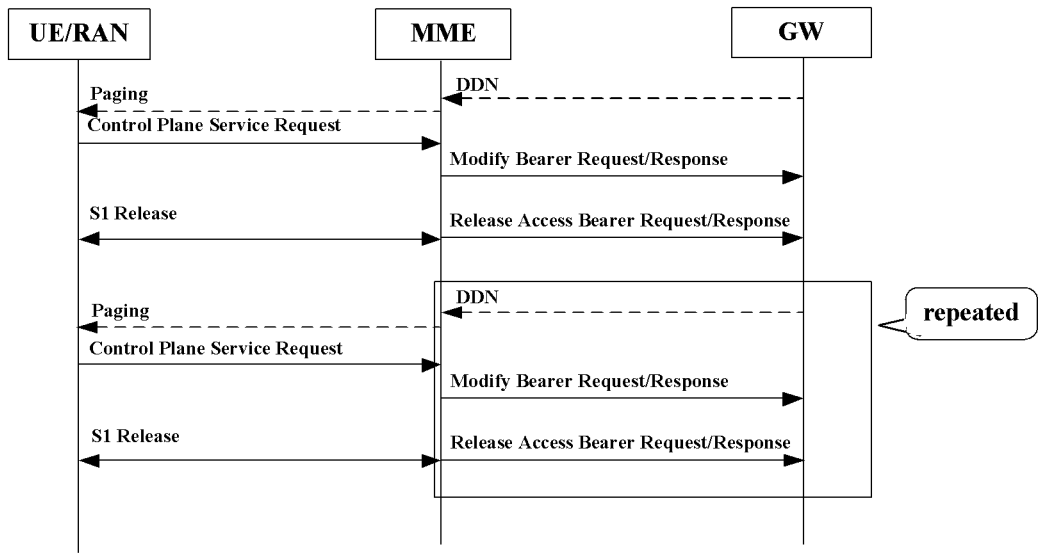
FIG. 1 shows a signaling diagram about setting up and releasing S11-U connection, according to the prior art.
Figure 2:
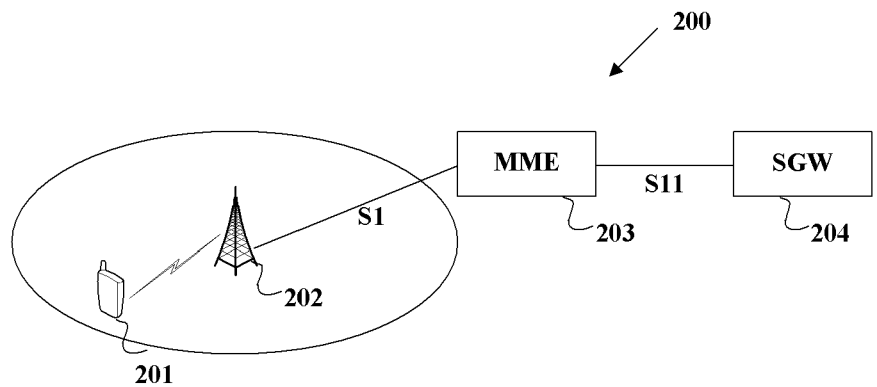
FIG. 2 shows a schematic diagram of an example wireless communication system, in which the embodiments can be implemented.

FIG. 2 shows a schematic diagram of an example wireless communication system 200, in which the embodiments can be implemented. The wireless communication system 200 may apply to one or more Radio Access Technologies (RAT), such as Global System for Mobile Communication (GSM), Wideband Code Division Multiple Access (WCDMA), Worldwide Interoperability for Microwave Access (WiMAX), Long-Term Evolution (LTE), LTE Advanced (LTE-A), 5th-generation mobile communication technology (5G) or any other radio access technology, in one embodiment.

In one embodiment, the wireless communication system 200 may include at least one wireless device 201 (for example, UE), a base station 202, a mobility management node (for example MME 203), and an SGW 204. Although the mobility management node is shown as MME 203 in this embodiment, the mobility management node can be embodied as Access and Mobility Management Function (AMF) or Session Management Function (SMF) for 5G. The at least one wireless device 201 and the base station 202 can be included in a Radio Access Network (RAN).

In one embodiment, the base station 202 may embodied as for example eNodeB (eNB), network controller, radio network controller (RNC), base station controller (BSC), relay, donor node controlling relay, base transceiver station (BTS), access point (AP), transmission points, transmission nodes, etc.

Figure 3:
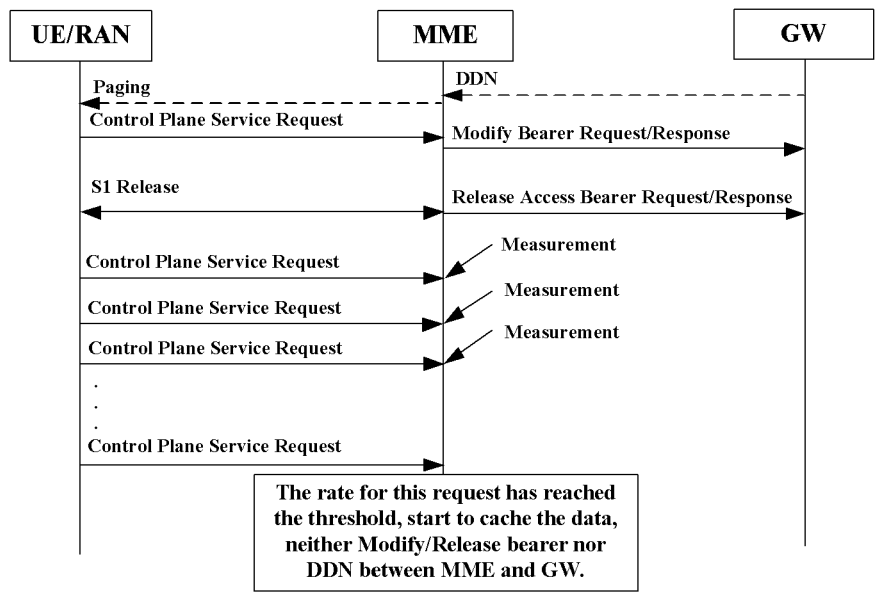
FIG. 3 shows an example signaling diagram, according to the embodiments.

FIG. 3 shows an example signaling diagram, according to the embodiments. In one embodiment, the signaling in FIG. 3 can be implemented in the wireless communication system 200.

The flow in the example signaling diagram in FIG. 3 may comprise the following steps:

1. The service server may trigger a downlink data to be transferred to the UE and trigger a Downlink Data Notification (DDN) from the SGW to MME.

In one embodiment, this step can be implemented by the signaling "DDN" as shown in FIG. 3. In one embodiment, the signaling "DDN" shown in FIG. 3 in dashed line may be optional.

2. The control plane service request could be triggered for uplink payload or downlink payload resulting in a service request (paging response) from UE.

In one embodiment, the paging request from the network may be implemented by the signaling "Paging" as shown in FIG. 3. In one embodiment, the signaling "Paging" shown in FIG. 3 in dashed line may be optional.

In one embodiment, the control plane service request may be implemented by the signaling "Control Plane Service Request" as shown in FIG. 3. In one embodiment, an S1 connection may be established (i.e., set up) between the MME 203 (mobility management node) and the base station 202 serving the wireless device 201 via the "Control Plane Service Request" signaling.

3. MME sets up the S11-U connection to gateway with modify bearer request procedure.

In one embodiment, this step may be implemented by the signaling "Modify Bearer Request/Response" as shown in FIG. 3. In one embodiment, an S11-U connection may be established (i.e., set up) via the "Modify Bearer Request/Response" procedure. Further details regarding the establishment of the S1 connection and S11-U connection are omitted, since they are known by persons skilled in the art.

4. S1 is released if the data transferring finished and access bearer between MME and SGW is also released.

In one embodiment, this step may be implemented by the signaling "S1 Release" as shown in FIG. 3. In one embodiment, the S1 connection is released, once the data transferring between the MME 203 (the mobility management node) and the wireless device (UE) 201 is finished.

In one embodiment, this step also includes the signaling "Release Access Bearer Request/Response" as shown in FIG. 3, if the data transferring request for the wireless device 201 is not sent frequently (i.e., low frequency data transferring request is monitored).

5. Several service requests are triggered due to frequent data transferring request.

In one embodiment, the several service requests are shown as a plurality of signaling "Control Plane Service Request" in FIG. 3. In one embodiment, the MME 203 can monitor the frequency of data transferring request for the wireless device 201, for example the MME 203 can perform a measurement to determine high frequency data transferring request for the wireless device 201, i.e., to determine that the data transferring request is sent frequently by wireless device 201.

In one embodiment, the MME 203 may measure the number of data transferring request for the wireless device 201, during a time period. In one embodiment, the time period may be for example one hour, two hours, one day, one week, or any other time period.

Then, the MME 203 may determine whether the data transferring request is high frequency data transferring request or low frequency data transferring request by comparing the measured number of data transferring request during a time period with a threshold. For example, the MME 203 may determine that high frequency data transferring request is monitored (i.e., the data transferring request is sent by wireless device 201 frequently), if the number of data transferring request during a time period is equal to or greater than a predefined threshold; otherwise the MME 203 may determine that low frequency data transferring request is monitored (i.e., the data transferring request is not sent by wireless device 201 frequently). In one embodiment, the predefined threshold is set by the MME 203.

In one embodiment, the MME 203 may determine high frequency data transferring request and low frequency data transferring request based on historical statistics data. For example, if a wireless device 201 such as a shared bicycle always sends data transferring request frequently at eight o'clock in the morning according to the historical statistics data, then the MME 203 may determine that the wireless device 201 will also send data transferring request frequently at eight o'clock in this morning.

6. If the measurement threshold reached, MME may decide to cache the data; neither sequent Modify/Release bearer request procedure nor DDN procedure is performed between MME and gateway (GW).

In one embodiment, the MME 203 may decide whether or not to release the S11-U connection based on the frequency of data transferring request. For example, the MME 203 may retain the S11-U connection without releasing or modifying, if high frequency data transferring request is determined. That is, when the MME 203 determines that the wireless device 201 (such as UE) sends data transferring request frequently, the MME 203 does not perform any "Release Access Bearer Request/Response" as shown in FIG. 3.

In one embodiment, in response to high frequency data transferring request, the MME 203 may decide to cache the data for the wireless device 201, wherein there is no subsequent Modify Bearer Request procedure, Release Access Bearer Request procedure, or Downlink Data Notification (DDN) procedure between the mobility management node (such as MME 203) and the gateway node (such as SGW 204). As a result, the signaling between MME 203 and SGW 204 can be reduced significantly without introducing extra signaling or message to the existing network.

In one embodiment, if the MME 203 determines that the data transferring request for the wireless device 201 is not sent frequently (low frequency data transferring request, for example the number measured by the MME 203 is lower than the predefined threshold), then the MME 203 may decide to release the S11-U connection (for example releasing the S11-U bearer) by Release Bearer Request procedure.

Figure 4:
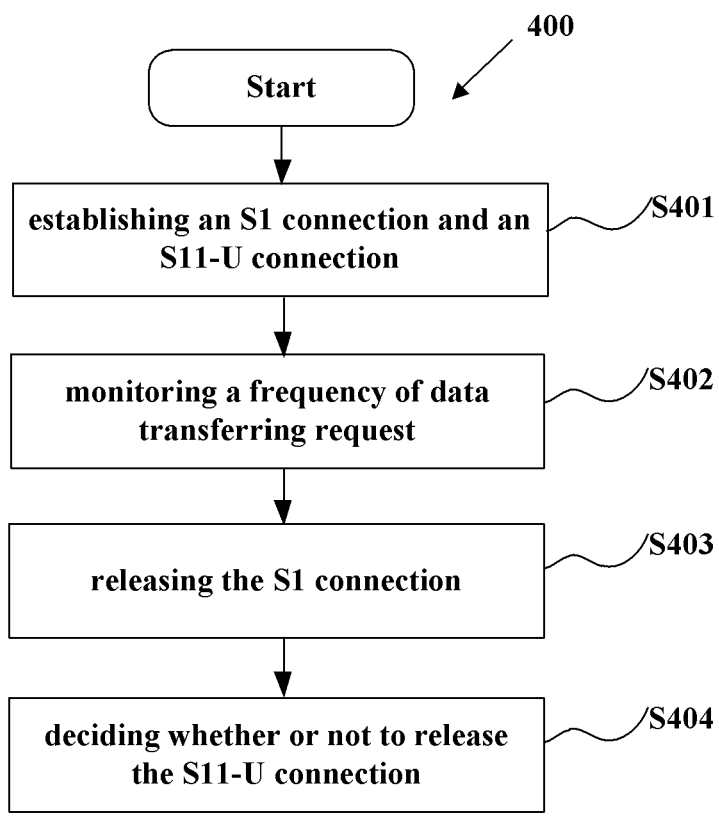
FIG. 4 is a schematic flow chart showing a method in MME, according to the embodiments.

FIG. 4 is a schematic flow chart 400 showing a method in MME 203, according to the embodiments.

The method 400 may begin with step S401, establishing an S11-U connection between the mobility management node (such as the MME 203) and a gateway node (such as the SGW 204). In one embodiment, the step S401 also includes establishing a S1 connection between the mobility management node (such as the MME 203) and the base station 202 (such as eNode B or eNB) serving the wireless device 201 (such as UE).

In one embodiment, the S11-U connection and the S1 connection may be established via the signaling "Control Plane Service Request" and "Modify Bearer Request/Response" as shown in FIG. 3 respectively. In one embodiment, the S11-U connection and the S1 connection may be established via the approach known by persons skilled in the art.

In one embodiment, the method 400 may proceed to step S402, the MME 203 may monitor the frequency of data transferring request for the wireless device 201 (for example, request received from the wireless device 201 via base station 202). For example, the MME 203 may determine whether the data transferring request is sent frequently. In one embodiment, the MME 203 may determine the high/low frequency data transferring request by referring the above approaches described in FIG. 3.

In one embodiment, the method 400 may proceed to step S403, the MME 203 may release the S1 connection once the data transferring between the mobility management node and the wireless device is finished.

In one embodiment, the method 400 may proceed to step S404, the MME 203 may decide whether or not to release the S11-U connection based on the frequency of data transferring request.

In one embodiment, if the MME 203 determines the data transferring request is sent frequently (i.e., high frequency data transferring request is monitored), then the MME 203 may decide to retain the S11-U connection without releasing or modifying.

In one embodiment, in response to high frequency data transferring request, the MME 203 will cache the data for the wireless device 201, and there is no subsequent Modify Bearer Request procedure, Release Access Bearer Request procedure, or Downlink Data Notification (DDN) procedure between the mobility management node and the gateway node. As a result, the signaling between MME 203 and SGW 204 can be reduced significantly without introducing extra signaling or message to the existing network.

In one embodiment, if the MME 203 determines the data transferring request is not sent frequently (i.e., low frequency data transferring request is monitored), then the MME 203 may release the S11-U connection (for example releasing the S11-U bearer) for example by Release Bearer Request procedure or any approach known by persons skilled in the art.

Figure 5:
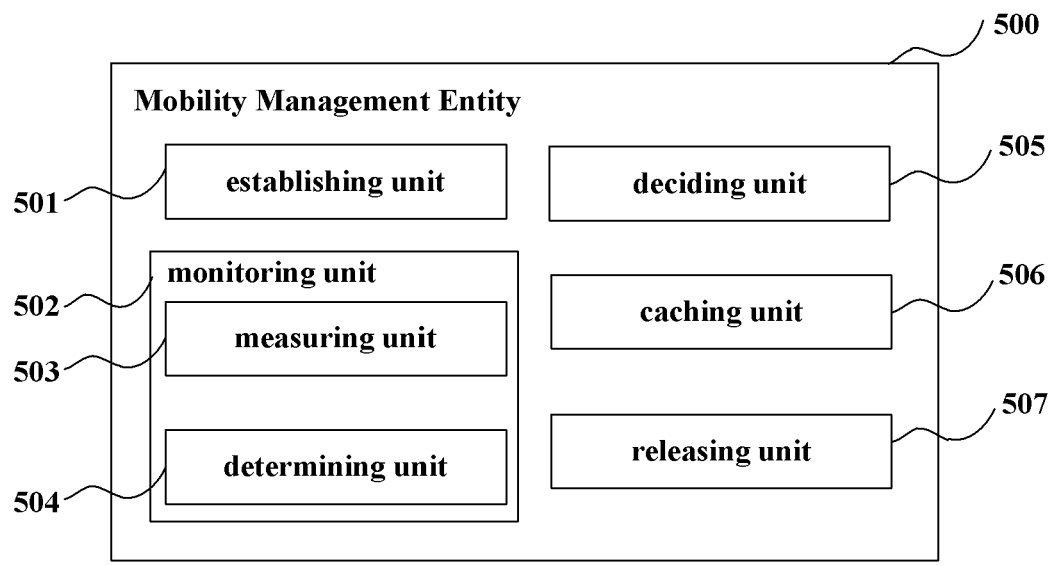
FIG. 5 is a schematic block diagram showing an apparatus configured to operate as MME, according to the embodiments.

FIG. 5 is a schematic block diagram showing an apparatus 500 configured to operate as MME 203, according to the embodiments.

In one embodiment, the apparatus 500 may include but not limit to an establishing unit 501, a monitoring unit 502, a deciding unit 505, a caching unit 506, and a releasing unit 507.

In one embodiment, the establishing unit 501 may be configured to establish the above mentioned S1 connection and/or S11-U connection.

In one embodiment, the monitoring unit 502 may monitor the frequency of data transferring request for a wireless device. In one embodiment, the monitoring unit 502 further includes a measuring unit 503, and a determining unit 504, however the embodiments does not limit to that.

In one embodiment, the measuring unit 503 may measure the number of data transferring request sent from the wireless device 201.

In one embodiment, the determining unit 504 may determine whether the data transferring request is sent frequently based on the number measured by the measuring unit 503 or based on the historical statistics data.

In one embodiment, the deciding unit 505 may decide whether or not to release the S11-U connection based on the frequency of data transferring request. In one embodiment, the deciding unit 505 may decide to retain the S11-U connection without releasing or modifying, in response to high frequency data transferring request is monitored by the monitoring unit 502; otherwise, the deciding unit 505 may decide to release the S11-U connection (for example releasing the S11-U bearer), in response to low frequency data transferring request is monitored by the monitoring unit 502.

In one embodiment, the caching unit 506 will cache the data for the wireless device 201 in response to high frequency data transferring request. There is no subsequent Modify Bearer Request procedure, Release Access Bearer Request procedure, or Downlink Data Notification (DDN) procedure between the mobility management node and the gateway node. As a result, the signaling between MME 203 and SGW 204 can be reduced significantly without introducing extra signaling or message to the existing network.

In one embodiment, the releasing unit 507 may retain the S11-U connection without releasing or modifying, if the deciding unit 505 decides to not release the S11-U connection. In one embodiment, the releasing unit 507 may release the S11-U connection by Release Bearer Request procedure, if the deciding unit 505 decides to release the S11-U connection.

In one embodiment, the releasing unit 507 may release the S1 connection once the data transferring between the mobility management node (such as the MME 203) and the wireless device 201 is finished.

Note that, the above establishing unit 501, monitoring unit 502, measuring unit 503, determining unit 504, deciding unit 505, caching unit 506, and releasing unit 507 can implemented by a establishing circuit or module, a monitoring circuit or module, a measuring circuit or module, a determining circuit or module, a deciding circuit or module, a caching circuit or module, and a releasing circuit or module respectively.

Figure 6:
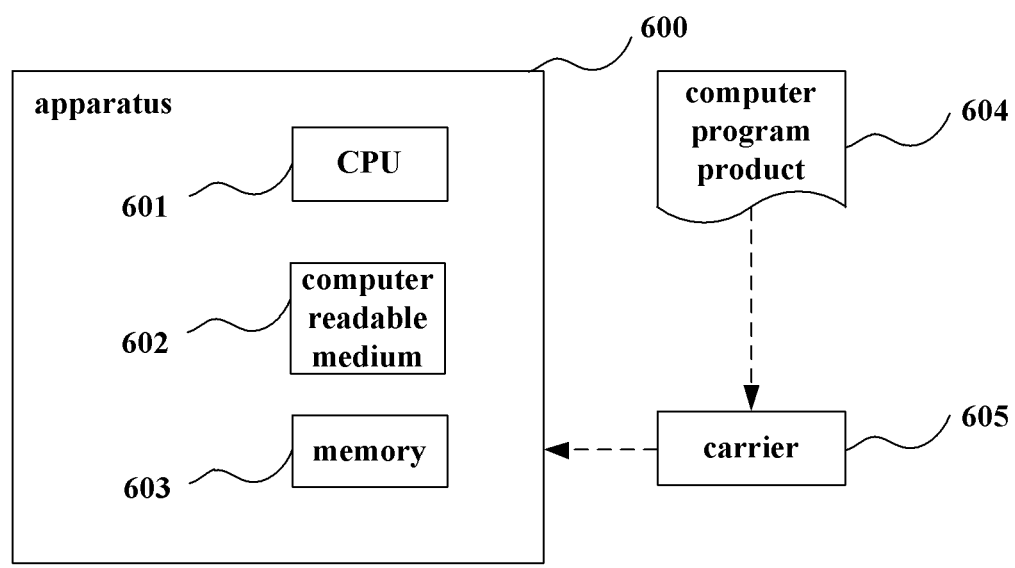
FIG. 6 is a schematic block diagram showing an apparatus, according to the embodiments.

FIG. 6 is a schematic block diagram showing an apparatus 600, according to the embodiments. In one embodiment, the apparatus 600 can be configured as the above mentioned mobility management node, such as the MME 203, AMF, SMF, and the like.

In one embodiment, the apparatus 600 may include but not limited to at least one processor such as Central Processing Unit (CPU) 601, a computer-readable medium 602, and a memory 603. The memory 603 may comprise a volatile (e.g. Random Access Memory, RAM) and/or non-volatile memory (e.g. a hard disk or flash memory). In one embodiment, the computer-readable medium 602 may be configured to store a computer program and/or instructions, which, when executed by the processor 601, causes the processor 601 to carry out any of the above mentioned methods.

In one embodiment, the computer-readable medium 602 (such as non-transitory computer readable medium) may be stored in the memory 603. In another embodiment, the computer program can be stored in a remote location for example computer program product 604, and accessible by the processor 601 via for example carrier 605.

The computer-readable medium 602 and/or the computer program product 604 can be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP third Generation Partnership Project
5G 5th-generation mobile communication technology
AMF Access and Mobility Management Function
DDN Downlink Data Notification
DoNAS Data over Non-Access Stratum
GSM Global System for Mobile Communication
LTE Long-Term Evolution
LTE-A LTE Advanced
MME Mobility Management Entity
RAN Radio Access Network
RAT Radio Access Technology
SGW Serving GateWay
SMF Session Management Function
UE User Equipment
WCDMA Wideband Code Division Multiple Access
WiMAX Worldwide Interoperability for Microwave Access.

What is claimed is:

1. A method in a mobility management node, the method comprising:
    establishing an S11-U connection between the mobility management node and a gateway node;
    monitoring a frequency of data transferring requests for a wireless device, monitoring the frequency of data transferring requests further comprising:
        measuring a number of data transferring requests for the wireless device, during a time period; and
        determining that the frequency of data transferring requests for the wireless device is high, if the number is equal to or greater than a predefined threshold, the predefined threshold being set by the mobility management node;
    deciding whether or not to release the S11-U connection based on the frequency of data transferring requests for the wireless device; and
    in response to the frequency of data transferring requests for the wireless device being deemed as high, retaining the S11-U connection, without the S11-U connection being released or modified.

2. The method according to claim 1, wherein monitoring the frequency of data transferring requests is based on historical statistics data.

3. The method according to claim 1, further comprising:
establishing an S1 connection between the mobility management node and a base station serving the wireless device; and
releasing the S1 connection once data transferring between the mobility management node and the wireless device is finished.

4. The method according to claim 3, wherein the S1 connection is established via a Control Plane Service Request from the wireless device, and wherein the S11-U connection is established via a Modify Bearer Request/Response procedure.

5. The method according to claim 3, wherein the mobility management node is a Mobility Management Entity (MME), Access and Mobility Management Function (AMF), or Session Management Function (SMF), wherein the gateway node is a serving gateway (SGW), and wherein the base station is an evolved Node B (eNB).

6. The method according to claim 1, further comprising:
in response to the frequency of data transferring requests for the wireless device being deemed as high, caching data for the wireless device, wherein there is no subsequent Modify Bearer Request procedure, Release Access Bearer Request procedure, or Downlink Data Notification (DDN) procedure between the mobility management node and the gateway node.

7. The method according to claim 1, further comprising:
releasing the S11-U connection by a Release Bearer Request procedure, in response to the frequency of data transferring requests for the wireless device being deemed as low.

8. An apparatus configured to operate as a mobility management node, the apparatus comprising:
at least one processor; and
a non-transitory computer readable medium coupled to the at least one processor, the non-transitory computer readable medium containing instructions executable by the at least one processor, whereby the at least one processor is configured to:
establish an S11-U connection between the mobility management node and a gateway node;
monitor a frequency of data transferring requests for a wireless device, monitoring the frequency of data transferring requests further comprising:
measuring a number of data transferring requests for the wireless device, during a time period; and
determining that the frequency of data transferring requests for the wireless device is high, if the number is equal to or greater than a predefined threshold, the predefined threshold being set by the mobility management node;
decide whether or not to release the S11-U connection based on the frequency of data transferring requests for the wireless device; and
in response to the frequency of data transferring requests for the wireless device being deemed as high, retain the S11-U connection, without the S11-U connection being released or modified.

9. The apparatus according to claim 8, wherein the at least one processor is configured to monitor the frequency of data transferring requests based on historical statistics data.

10. The apparatus according to claim 8, wherein the at least one processor is further configured to:
establish an S1 connection between the mobility management node and a base station serving the wireless device; and
release the S1 connection once data transferring between the mobility management node and the wireless device is finished.

11. The apparatus according to claim 10, wherein the S1 connection is established via a Control Plane Service Request from the wireless device, and wherein the S11-U connection is established via a Modify Bearer Request/Response procedure.

12. The apparatus according to claim 10, wherein the mobility management node is a Mobility Management Entity (MME), Access and Mobility Management Function (AMF), or Session Management Function (SMF), wherein the gateway node is a serving gateway (SGW), and wherein the base station is an evolved Node B (eNB).

13. The apparatus according to claim 8, wherein the at least one processor is further configured to:
in response to the frequency of data transferring requests for the wireless device being deemed as high, cache data for the wireless device, wherein there is no subsequent Modify Bearer Request procedure, Release Access Bearer Request procedure, or Downlink Data Notification (DDN) procedure between the mobility management node and the gateway node.

14. The apparatus according to claim 8, wherein the at least one processor is further configured to:
release the S11-U connection by Release Bearer Request procedure, in response to the frequency of data transferring requests for the wireless device being deemed as low.

* * * * *